United States Patent
Kodali et al.

(10) Patent No.: US 8,565,221 B2
(45) Date of Patent: Oct. 22, 2013

(54) DOMAIN SPECIFIC PLMN SELECTION

(75) Inventors: Pradeep Kodali, Hyderabad (IN); Shivank Nayak, Hyderabad (IN); Uttam Pattanayak, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 509 days.

(21) Appl. No.: 12/615,937

(22) Filed: Nov. 10, 2009

(65) Prior Publication Data

US 2010/0195643 A1 Aug. 5, 2010

Related U.S. Application Data

(60) Provisional application No. 61/119,868, filed on Dec. 4, 2008.

(51) Int. Cl.
*H04L 12/66* (2006.01)
*H04W 4/00* (2009.01)

(52) U.S. Cl.
USPC .......................................... 370/352; 455/435.2

(58) Field of Classification Search
None
See application file for complete search history.

(56) References Cited

U.S. PATENT DOCUMENTS

2005/0153691 A1* 7/2005 Xue et al. .................... 455/432.1
2007/0202875 A1* 8/2007 Dorsey et al. ................ 455/434
2007/0211674 A1* 9/2007 Ragnar Karlberg et al. .. 370/338
2008/0020761 A1* 1/2008 Park ............................. 455/434
2010/0048208 A9* 2/2010 Gunaratnam et al. ..... 455/435.2

FOREIGN PATENT DOCUMENTS

WO WO2008071602 6/2008

OTHER PUBLICATIONS

International Search Report and Written Opinion—PCT/US2009/066878—International Search Authority—European Patent Office, Apr. 7, 2010.
QUALCOMM Europe: "Discussion: Connecting to a PLMN that provides both CS and PS Services versus connecting to the highest priority available PLMN," 3GPP Draft; 3rd Generation Partnership Project, October 13, 2008.

* cited by examiner

*Primary Examiner* — John Blanton
(74) *Attorney, Agent, or Firm* — Darren M. Simon

(57) ABSTRACT

A mobile communication device includes a domain selection feature that allows a user to select a domain preference such as a circuit switched (CS) voice domain preference, a packet switched (PS) data domain preference, or a (CS+PS) domain preference. The mobile device receives Public Land Mobile Network (PLMN) ID and domain availability information from one or more PLMNs. A PLMN priority list is generated on the basis of the received PLMN information and the user domain preference selection. PLMNs having the user selected service available are assigned a higher priority than those that don't currently have the service, whereby an original PLMN list may be updated. Thereby, the mobile device is more likely to obtain the desired service without resorting to a time consuming manual selection process.

21 Claims, 7 Drawing Sheets

DOMAIN SPECIFIC PLMN SELECTION

RELATED APPLICATIONS

The present Application for Patent claims priority under 35 U.S.C. §119 to Provisional Application No. 61/119,868 entitled "DOMAIN SPECIFIC PLMN SELECTION" filed Dec. 4, 2008, and assigned to the assignee hereof and hereby expressly incorporated by reference herein.

TECHNICAL FIELD

The present disclosure relates generally to wireless communications.

BACKGROUND

In today's wireless communication networks, Public Land Mobile Networks (PLMNs) have been established to provide land mobile telecommunications service to the public. Generally, each service provider operates its own PLMN, albeit a number of service providers may share some network equipment. The number of PLMNs in a country may be as little as a single PLMN in a small country, to as many as twenty or more in a large country like India. A PLMN may provide service in one, or a combination, of frequency bands. Different PLMNs present in a common geographical region or cell may operate using the same or different access technologies such as time division multiplexed (TDM) based Global System for Mobile communications (GSM), or, CDMA based systems such as CDMA2000 or WCDMA.

Most of the time, a mobile terminal (MT) communicates via its own service provider's PLMN, which is called the Home PLMN (HPLMN). Occasionally, the MT cannot acquire service on the HPLMN, or it may lose service. In this case, the MT may attempt service acquisition on another PLMN, and if successful, this PLMN is designated a Visited PLMN (VPLMN). The attempt to employ a VPLMN is what is commonly known as roaming. Typically, a prioritized list of PLMNs that the MT is allowed to access is stored on a Subscriber Identity Module (SIM) card or other non-volatile memory within the MT. The entries and prioritization in the list is usually based on agreements contracted among the various service providers.

In networks that operate in accordance with the current Third Generation Partnership Project (3GPP) protocol, the MT (also referred to as User Equipment or UE) supports both automatic and manual network selection mechanisms (modes) as described, e.g., in specification 3GPP TS 22.011. In the automatic selection mode, which is the mode used the vast majority of time, the MT consults the PLMN priority list pre-established by the network operator (service provider), and attempts to register on a PLMN in accordance with the listed priority. If registration cannot initially be obtained on the HPLMN, the MT will then attempt to register on the next highest priority PLMN on the list, and so on, until service is acquired.

In the manual selection mode, the user is given an opportunity to select an available PLMN. The MT contains display functions by which available PLMNs and the selected PLMN can be indicated. For instance, in a "settings" display function, various settings of the MT may include available PLMNs which can be selected by the user.

SUMMARY

Figure 1:
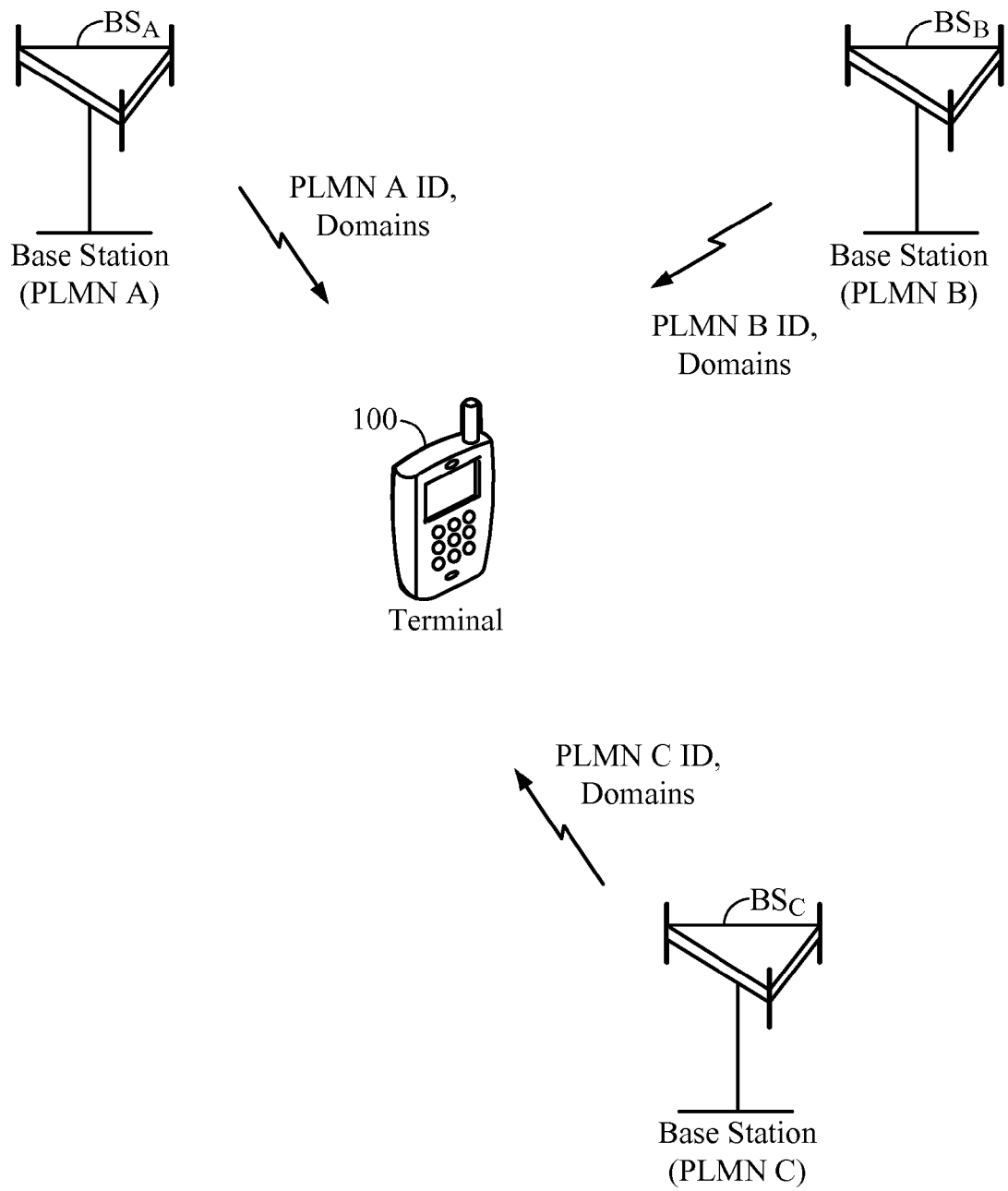
FIG. 1 illustrates a wireless communication system including a mobile terminal (MT) in proximity of multiple base stations each associated with a different PLMN.

A device for use in a wireless communication system includes, in an exemplary embodiment, a domain preference selector to provide user selection candidates for domain preferences, including at least circuit switched (CS) voice and packet switched (PS) data domain preference candidates. The device further includes a PLMN priority list generator to obtain PLMN domain availability information and to assign a priority to one or more PLMNs on the basis of the obtained information and a user selection of one of the domain preferences. A registration attempt may then be made on one or more PLMNs in accordance with the newly assigned priority. Thereby, a user of the device is more likely to obtain desired service without resorting to a time consuming manual selection process.

As examples, the domain preference candidates may include such selections as CS voice preferred; PS data preferred; (CS+PS) preferred; CS voice only; and PS data only.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

Devices and methods for domain specific PLMN selection are disclosed herein which are designed to improve the mobile terminal user experience.

As used herein, the terms "circuit switched" (CS) or "CS voice" refer to a voice communication session for which dedicated network resources are allocated at the connection establishment and released at the connection release. As used herein, the terms "packet switched" (PS) or "PS data" refer to a data communication session that transports user information using autonomous concatenation of bits called packets, where each packet can be routed independently from the previous one. Packet switched, as used herein, refers to a transmission scheme for data communication such as web surfing or email retrieval; it does not refer to voice communication sessions between a mobile terminal and another terminal that might be performed using a packet type transmission. This distinction will become more apparent in the description below.

Many mobile terminals in use today are equipped with both CS voice and PS data communication capabilities. These types of devices will hereafter be referred to as CS+PS capable devices. Some of these devices can support a CS voice session and PS data session simultaneously. Other, less exotic MTs are equipped only with CS voice capability, or only with PS data capability.

As mentioned, a conventional MT is designed to operate during the majority of time by accessing its HPLMN to thereby use the network resources of its own service provider. Further, a MT subscriber with a CS+PS capable device would normally appreciate the option to communicate via a desired CS voice or PS data connection in any geographical location to which he or she may travel. With current systems, however, a number of situations can arise where the user may fail to obtain a desired CS voice or PS data service.

For instance, the MT may have traveled to a region where the HPLMN is capable of providing CS voice service but not PS data service. This deficiency may be a permanent one due to lack of appropriate resources, or, it may be only temporary due to network congestion, network maintenance, technical problems, etc. In the meantime, the MT may already be "camped" on a cell of the HPLMN. (An MT is considered camped on a PLMN cell when it has chosen that cell to provide available services, and tunes to its control channel. The MT will then typically register its presence in the registration area of the chosen cell.) In this case, if the MT attempts to obtain PS data service via the camped-on HPLMN cell, the attempt will fail.

At this point, if the MT is set to the automatic network selection mode, the MT will not automatically attempt to obtain PS data service on an alternative PLMN. That is, since the MT is already considered registered with the HPLMN, the network doesn't recognize the need for an access attempt on another PLMN. The subscriber, however, may then opt to access the settings menu of the MT to switch to a manual network selection mode. The subscriber can then select one PLMN at a time from the stored PLMN list in an attempt to obtain PS data service. The selections are made without knowing which PLMNs on the list might have essentially the same problem as the HPLMN, i.e., lacking PS data service capability in the current location. Thus, after a manual selection, the MT may camp and register on a new, user selected PLMN, yet still be unable to obtain PS data service. The user may then repeat the procedure for yet another PLMN. Naturally, this represents a burdensome and time consuming operation to the user.

An analogous situation arises when a CS+PS capable MT has traveled to a region in which the HPLMN is providing adequate PS data service but has no current CS voice capability. Here, despite the CS voice capability deficiency, the MT may still wind up camped and registered on the HPLMN. Thereby, the MT is unable to make a CS call and may wind up with only emergency service (if the HPLMN has emergency service capability). Again, as in the PS service deficient case discussed above, if the MT is in the automatic network selection mode, no alternative PLMN will be sought. If the MT has manual network selection mode capability, the subscriber may manually scroll through the available PLMN candidates and attempt to acquire CS service one by one in the same time consuming manner as just described for the PS data service case.

In the two cases just discussed, the MT is initially camped or registered on a HPLMN cell but still cannot readily obtain the desired CS or PS service. In another scenario, the HPLMN may be unavailable, whereby the MT winds up camped or registered on the highest priority available PLMN ("HPA-PLMN"). An MT determines if a PLMN is "available" by decoding PLMN identification codes of sufficient strength transmitted in control channels of an access technology supported by the MT, such as GSM, CDMA2000 or WCDMA. Once registration is attempted on the HPA-PLMN, the same undesirable situation that may occur with the HPLMN as described above can likewise arise with the HPA-PLMN. That is, the HPA-PLMN may be currently providing only CS voice or PS data service, but not both, whereby the subscriber is unable to obtain the service he or she desires. The subscriber may then once again attempt a desired acquisition by going through the onerous manual PLMN selection process for the remaining PLMNs on the list.

In accordance with embodiments described herein, a mobile terminal is provided with a feature that allows the user to select a preference for a domain—e.g., a CS voice and/or a PS data domain. A PLMN priority list is then generated in accordance with the selected preference. This technique ensures that a desired service is more likely to be obtained on an available PLMN capable of providing the service, whereby the MT will not be "stuck" on a PLMN lacking such capability.

FIG. 1 illustrates a wireless communication system including a mobile terminal 100 in proximity of multiple base stations ($BS_A$, $BS_B$ and $BS_C$) each associated with a different PLMN (PLMN A, PLMN B and PLMN C, respectively).

MT 100 is capable of supporting a voice or data communication session through any of these PLMNs. For simplicity, it is assumed that the base stations $BS_A$, $BS_B$ and $BS_C$ all operate using the same access technology. However, embodiments of the invention are also applicable to multi-technology mobile terminals, base stations, and networks that can support, e.g., both TDM and CDMA based technologies. MT 100 may also be called a user equipment device (UE), a mobile station (MS), a mobile equipment (ME), and so on. MT 100 may be a cellular phone, a laptop computer, a personal digital assistant, a wireless communication device, a subscriber unit, a "netbook" type device, etc.

Whether single or multiple access technologies are supported, each base station broadcasts an identification code in an overhead channel identifying its associated network PLMN. This broadcast, if received with sufficient signal strength by MT 100, enables the MT to ascertain if a PLMN is available for access via its corresponding base station (i.e., within the PLMN cell served by that base station). The overhead channel may also broadcast other necessary information to enable MT 100 to attempt registration in a given cell served by a base station, such as carrier frequencies or CDMA pseudo-noise (PN) codes allocated to that cell. Further, each base station broadcasts, on the overhead channel, information indicating domains that are supported or currently available on the particular network PLMN in the cell of the associated base station. The received domain information lets MT 100 know whether a CS voice domain is available, and whether a PS data domain is available. Each of base stations $BS_A$, $BS_B$ and $BS_C$ likewise transmit domain information for their respective PLMNs (PLMN A, PLMN B and PLMN C). This domain information can then be used by MT 100 to develop a user selectable domain specific PLMN priority list, as will be explained below in connection with exemplary embodiments.

Figure 2:
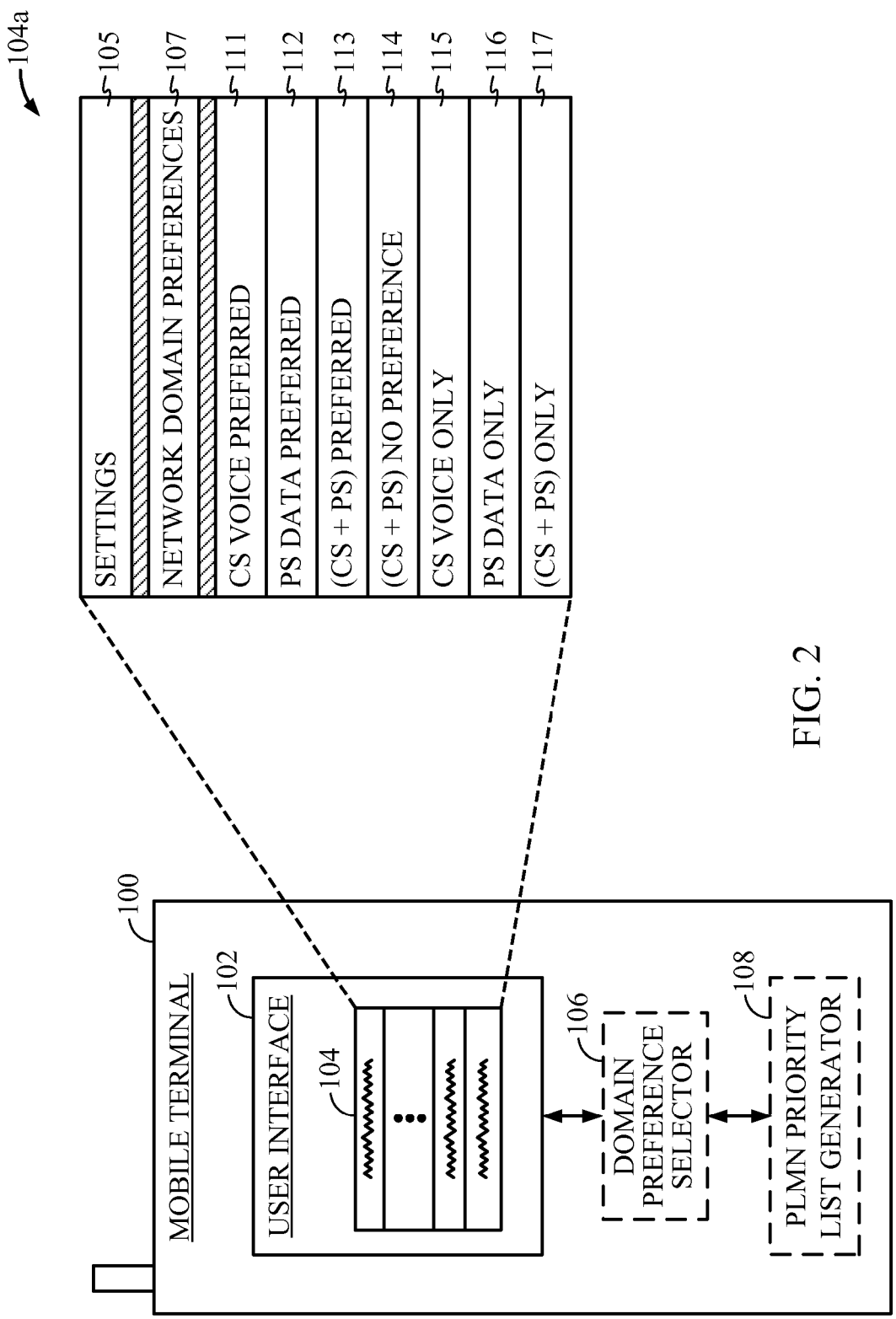
FIG. 2 is a high level functional block diagram of logic circuitry of the MT in FIG. 1, including a User Interface (UI), for performing domain preference selection by a user in accordance with an exemplary embodiment.

FIG. 2 is a high level functional block diagram of logic circuitry of MT 100 in FIG. 1, including a User Interface (UI) 102, for performing domain preference selection by a user in accordance with an exemplary embodiment. UI 102 includes a display 104 for displaying a variety of information. UI 102 may also include keypads (not shown) for making selections on a display 104 or for making display-independent selections. Optionally, display 104 might have a touch screen function enabling user selections to be made directly on the screen, whereby the inclusion of keypads may be avoided in UI 102.

MT 100 is capable of handling both CS voice and PS data communications. User interface 102 may include selection keypads or icons enabling a user to quickly initiate either a voice or data session. Hereafter, for clarity of illustration, it is assumed that the PS data communications handled by MT 100 do not involve an end to end voice communication session such as a Voice over Internet (VoIP) session. In this manner, the user of MT 100 can make selections between CS voice and PS data domain preferences to thereby provide a tailored PLMN acquisition procedure. This tailored procedure advantageously avoids or alleviates the above-noted problems with conventional MTs in terms of attaining desired service acquisition. To this end, MT 100 includes a domain preference selector 106 and a PLMN priority list generator 108, both operatively coupled to user interface 102. Domain preference selector 106 enables a user to make a network selection between at least a CS voice domain and a PS data domain. Domain selection candidates may be displayed in a settings menu of MT 100. Exemplary display menu 104*a*, shown as an expanded view of display 104, illustrates one way of presenting domain preference selections to the subscriber. Menu 104*a* includes domain preference selection fields 111-117 allowing a user to readily select a network domain preference.

By way of example, a user might want to make an important voice call and would like to ensure that the call is made on any one of the available PLMNs in the area such as PLMN A, PLMN B or PLMN C of FIG. 1, regardless of whether any of the available PLMNs is the MT's home PLMN. In this case, the user can access and select one of the "CS voice" options 109 ("CS Voice Preferred") or 115 ("CS Voice Only") in display menu 104*a* prior to attempting the call. The selection is then forwarded from UI 102 to PLMN list generator 108, which prioritizes PLMNs on the basis of the domain preference selection and the domains currently available on the available PLMNs. (As mentioned earlier in connection with FIG. 1, MT 100 receives domain availability information broadcast by the available PLMNs.) Thus, here, PLMN list generator 108 assigns PLMNs having CS voice capability with a higher priority than those lacking CS voice capability. MS 100 then attempts CS voice registration on PLMNs in an order defined by the assigned priority.

Display menu 104*a* includes, in the example shown, a "settings" field or icon 105 indicating to the user that a settings adjustment menu is currently being accessed. Field 107 indicates that a Network Domain Preferences sub-menu of the settings menu is currently being displayed and is accessible. A scroll key or the like (not shown) allows the user to scroll through selection fields and highlight a field for selection via depression of a dedicated key or via touch screen entry in a conventional manner. Exemplary selection fields 111-117, explained in detail below, are as follows: CS Voice Preferred field 111; PS Data Preferred field 112; (CS+PS) Preferred field 113; (CS+PS) No Preference field 114; CS Only field 115; PS Only field 116; and (CS+PS) Only field 117. It is understood that these selection options are illustrative and that mobile terminals in other embodiments may include less selection options (such as just a single CS voice and a single PS data domain preference option). Moreover, other domain preference options are possible, such as domain preference options for a PS data rate currently available from the respective PLMNs. In the latter option, subscribers yearning for a fast PS data communication may select an associated fast data rate domain preference, if the mobile terminal is so equipped (and provided the PLMNs are configured to broadcast their current data rates).

As an alternative to providing a display field interface as 104*b*, mobile device 100 can be equipped with dedicated keys or buttons (not shown) that are each associated with a specific domain preference selection. With this approach, the user could immediately depress the corresponding key for the desired domain preference, without accessing and scrolling through a settings menu on display 104.

Figure 3:
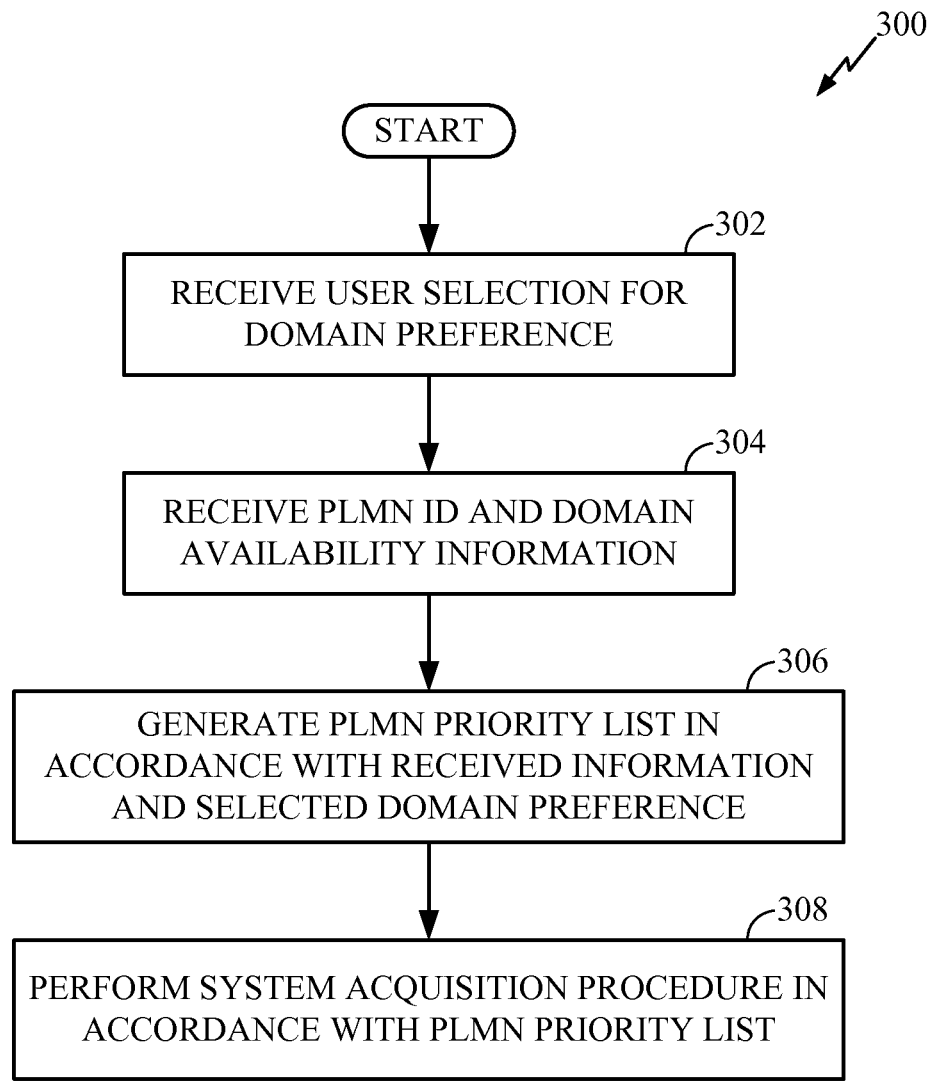
FIG. 3 shows a flow process for implementing domain specific PLMN user selection via the UI in accordance with an exemplary embodiment.

FIG. 3 shows a flow process 300 for implementing domain specific PLMN user selection via UI 102 in accordance with an exemplary embodiment. Domain specific PLMN user selection is performed by relevant logic circuitry (i.e., UI 102, Domain Preference Selector 106 and PLMN Priority List Generator 108) within MT 100. Referring collectively to FIGS. 2 and 3, in step 302 a user selection for a domain preference is received via UI 102. The domain preference may be one of the selections shown in display menu 104*a*, i.e., CS Voice Preferred, PS Data Preferred, etc. Next, in step 304, PLMN ID and domain availability information, received by MT 100 from available PLMNs in the neighborhood, is optionally retrieved from a stored memory location (not shown) in MT 100 (or is newly received from the various PLMNs). Then, in step 306, a PLMN priority list is generated in accordance with the retrieved PLMN ID/domain availability information and the user selected domain preference.

The PLMN priority list may be generated by updating an existing PLMN priority list stored in MT 100 memory, such as a SIM card. Thus, available PLMNs are still sorted as per the existing priority list, but now the user selected domain preference is taken into consideration and the PLMN priority list is updated (re-ordered). The updated list may be newly stored in volatile or non-volatile memory within MT 100.

In some cases, there can be multiple priority lists stored in MT 100. For instance, a user preferred PLMN list may be stored in memory in addition to an operator preferred PLMN list. When multiple lists are stored, the domain specified processes described herein (e.g., the process of FIG. 3) can be applied to update (re-prioritize) all of the lists, thereby forming a combined list. Alternatively, only some of the lists may be updated. The final priority list used for system acquisition may then become a combination of the updated lists and any list(s) not selected for updating.

Lastly, in step 308, a system acquisition procedure (i.e., an attempt at PLMN registration) is performed in accordance with the newly generated PLMN priority list. Accordingly, user preferences are taken into account during the PLMN acquisition procedure. In this exemplary embodiment, MT 100 chooses an originally designated lower priority PLMN (from, for example, a pre-programmed SIM card list) over an originally designated higher priority PLMN such as the HPLMN only if the originally higher priority PLMN is unable to provide the desired service. Accordingly, the user stands a better chance of obtaining his or her desired service type as compared to conventional methods.

Referring again to FIG. 2, when selection is made for either CS Voice Preferred mode (display field 111) or CS Voice Only mode (display field 115), MT 100 searches for all available PLMNs and assigns higher priority to available PLMNs that have at least CS voice capability. (The search for available PLMNs is either newly performed after the selection, or, the PLMN availability information has already been received by mobile 100 and is retrieved from memory within MT 100.) MT 100 then attempts registration on one or more of the higher priority PLMNs, i.e., those with at least CS capability. If, on one PLMN, MT 100 is unable to acquire the mandatory CS service (despite the prior indication from the PLMN that CS service was available), then it will skip that PLMN and try on the next PLMN on the list. If registration fails on all of the higher priority PLMNs for some reason, or, if no PLMNs were found indicating current CS capability, then at this point, the CS Voice Preferred mode differs from CS Voice Only mode as follows: if in the CS Voice Preferred mode, MT 100 will attempt registration on other available PLMNs (i.e., those with PS data service only in this case). However, if the chosen mode is CS Voice Only, MT 100 will not register on those PLMNs but will instead continue to attempt registration on those PLMNs that indicated CS capability (and also will continue to search for other available PLMNs having CS service capability).

PS Data Preferred mode (field 112) and PS Data Only mode (field 116) operate in the same manner as CS Voice Preferred and CS Voice Only modes, respectively, as just described, except of course the search and prioritization is performed for PS data capable PLMNs rather than CS voice capable PLMNs.

(CS+PS) Preferred mode (field 113) and (CS+PS) Only mode (field 114) also operate in the same manner as just described for CS fields 111 and 115, respectively, except that the search and prioritization is performed for (CS+PS) capable PLMNs, i.e., PLMNs indicating that they currently have both CS voice domain and PS data domain capability. If registration fails on all PLMNs that nevertheless indicated (CS+PS) capability, or, if no PLMNs were found to have had (CS+PS) capability, then: if in (CS+PS) Preferred mode, registration will be attempted on other available PLMNs (i.e., those with either CS or PS capability, but not both). If in (CS+PS) Only mode, registration will continue to be attempted on only those PLMNs that indicate (CS+PS) capability (and MT 100 will continue searching for other PLMNs that might have such capability).

Finally, (CS+PS) No Preference mode (field 114) is a mode in which no preference is made for CS or PS domains. Here, PLMN prioritization is performed in a conventional manner, such as in accordance with an original PLMN priority list stored on a SIM card of MT 100. The (CS+PS) No Preference mode may be set as a default mode.

Figure 4:
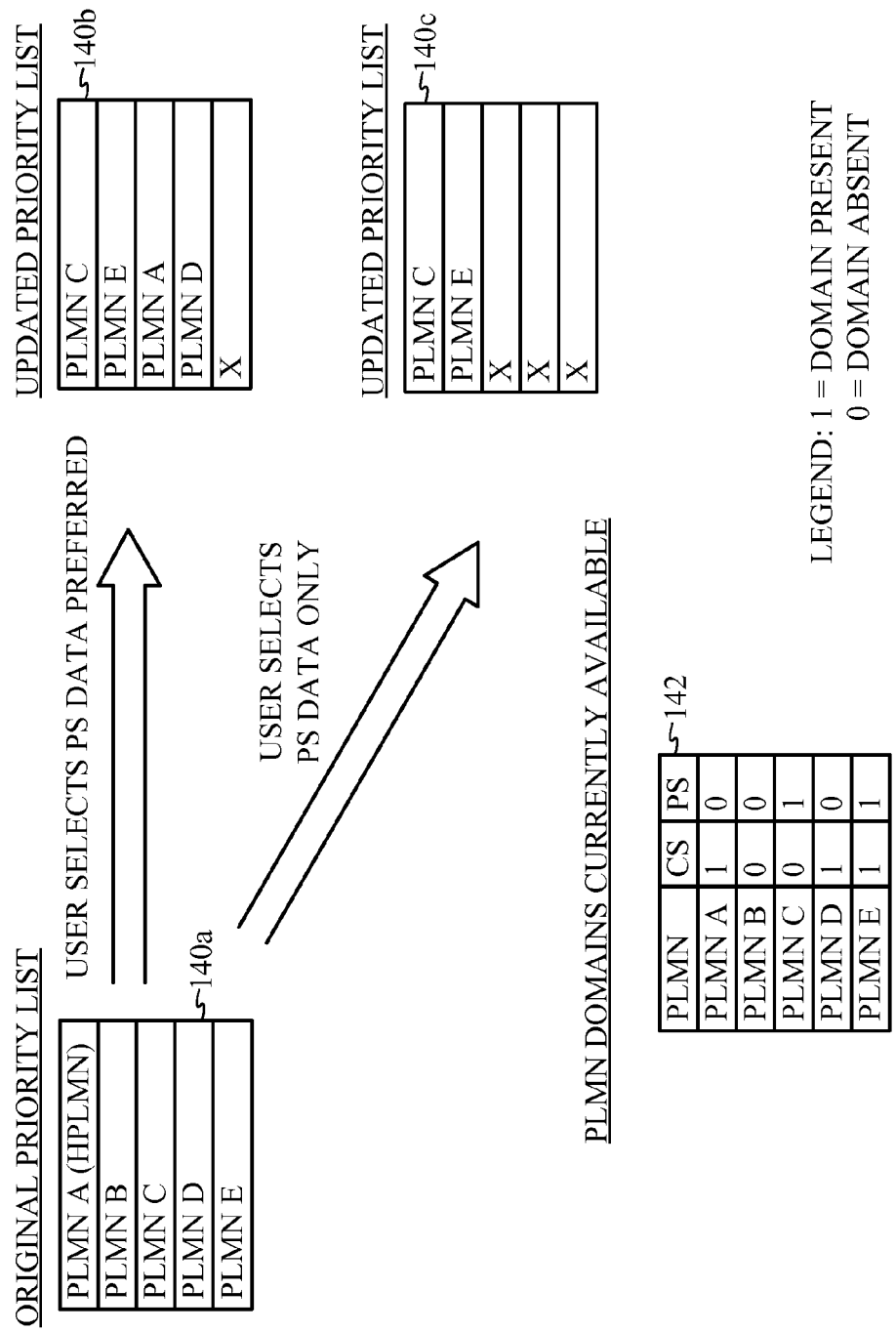
FIG. 4 shows example generated PLMN priority lists in response to a set of user domain preference selections for packet switched (PS) service availability in accordance with the exemplary embodiment.

FIG. 4 shows example generated PLMN priority lists in a MT in response to a set of user domain preference selections for packet switched service availability in accordance with the exemplary embodiment. The example PLMN priority lists are set forth to facilitate a clear understanding of embodiments disclosed herein. Examples for the PS Data Preferred mode and the PS Data Only mode are presented. The figure illustrates a procedure of generating a PLMN priority list by updating an original PLMN priority list 140a stored in memory within MT 100. Original priority list 140a may be a list that was initially stored in a SIM card or other non-volatile memory of MT 100. Original list 140a may alternatively be considered a list stored in volatile memory of MT 100 that has already been updated from an original SIM card list (e.g., by means of an automatic network download operation). Original list 140a may alternatively be a list that has already been updated, such as a user preferred PLMN priority list previously created in manual mode or otherwise. Noted also, in manual mode, the original PLMN list may be displayed on the UI menu for selection by the user.

In the example, network PLMN A (the HPLMN) is shown as having a highest priority in the original priority list 140a, followed by PLMNs B through E. A look up table 142, which may be for example stored in RAM of MT 100, contains entries indicating PLMN availability and current domain capability (CS voice or PS data). As explained in connection with FIG. 1, MT 100 receives this information broadcast in control channels by the various PLMNs. For instance, PLMN E has entries of 1 for both CS voice and PS data (a 1 entry denotes presence of service; a 0 entry denotes absence of service). PLMN A has current CS voice service but lacks PS data service. PLMN B is considered unavailable because it contains an entry of 0 for both CS and PS. With the domain conditions shown, when the MT 100 user selects the PS Data Preferred selection 112 of FIG. 2, updated PLMN priority list 140b is generated. In list 140b, PLMN C now has the highest priority among the five original choices because it was the highest priority PLMN in original priority list 140a having the selected PS data capability. Network PLMN E, which had the lowest priority previously, is now next on the priority list 140b because it is the only remaining PLMN with PS data capability. Networks PLMN A and D then follow, since they currently have only CS voice capability. Thus, as explained previously, if PS data registration nevertheless fails on networks PLMN C and E, MT 100 will then go ahead and attempt to register on PLMN A in this mode (despite the recognition of no PS data capability). Note that updated list 140b has no entry for network PLMN B since this network indicated neither CS nor PS capability and is therefore unavailable (e.g., its ID code was not received by MT 100 with sufficient strength to consider it available).

When the user selects the PS Data Only mode, alternate updated PLMN priority list 140c is generated. As explained earlier, PS Data Only mode differs from PS Data Preferred mode only during a condition in which no PLMNs indicating PS data capability are available (or, if registration attempts failed on all PLMNs that nevertheless indicated PS data availability). Thus, in priority list 140c, PLMN C is still at the top of the list, followed by PLMN E. However, the remaining entries are empty, since in this mode MT 100 will not "settle" for anything less than a PLMN having PS data capability.

Similarly, if in the conditions of FIG. 4, the user instead selects the CS Voice Preferred candidate, the updated priority list would contain four entries, from highest to lowest priority, in the order of PLMN A, followed by D, E and C. If the user instead selects CS Voice Only, the updated priority list would contain three entries in the order of PLMN A followed by D and then E.

Figure 5:
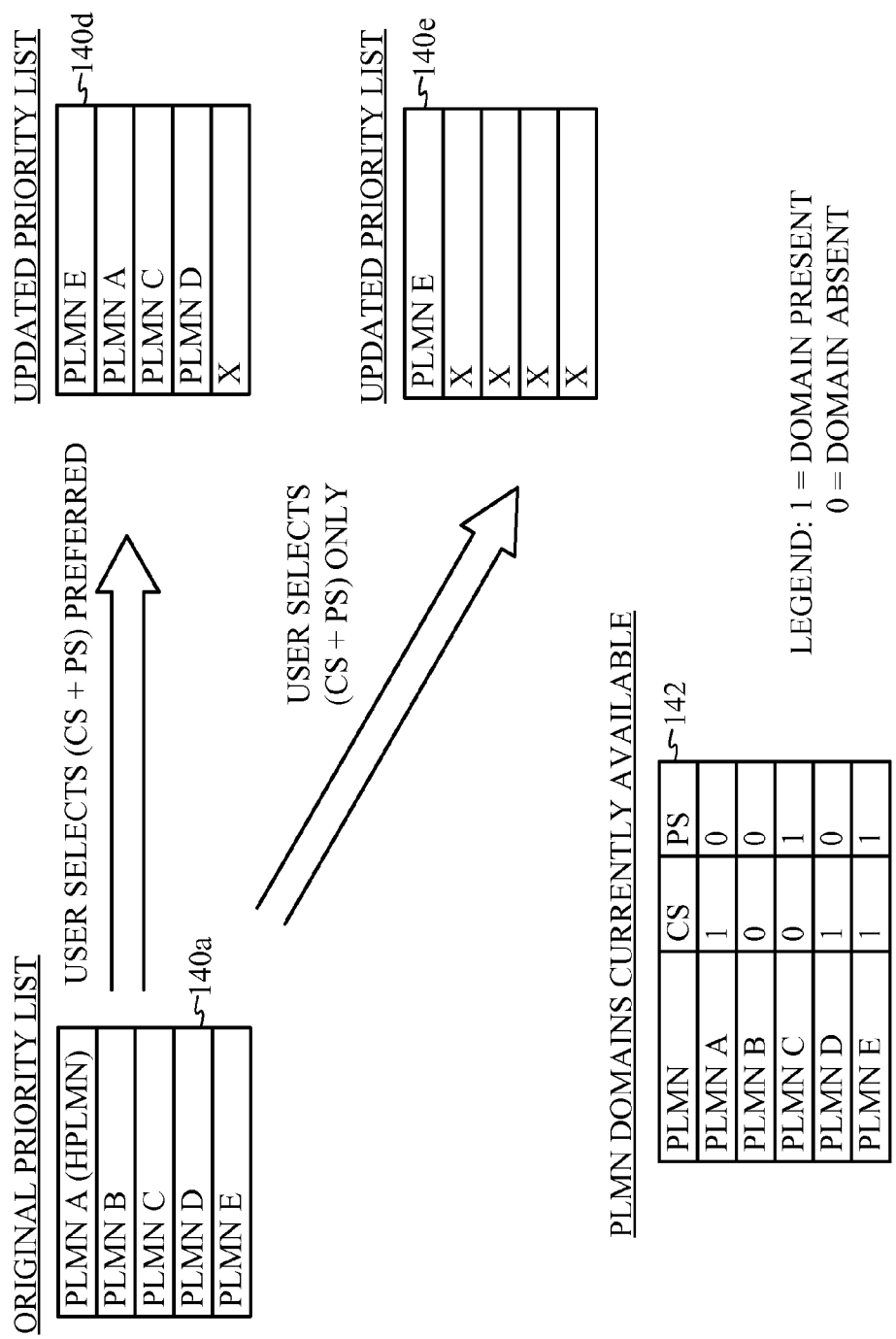
FIG. 5 shows example generated PLMN priority lists in response to a set of user domain preference selections for both circuit switched (CS) and packet switched (PS) service availability in accordance with the exemplary embodiment.

FIG. 5 shows example generated PLMN priority lists in response to a set of user domain preference selections for both circuit switched (CS) and packet switched (PS) service availability in accordance with the exemplary embodiment. Starting from original PLMN priority list 140a, updated list 140d is generated when the (CS+PS) Preferred mode is selected. Updated list 140e is generated when the (CS+PS) Only mode is selected. In FIG. 5, the entries in original priority list 140a and look up table 142 are the same as those in FIG. 4 and thus will not be again described. Since only PLMN E indicated both CS and PS capability, it is catapulted to the top of the updated PLMN priority list 140d. PLMN E is then followed by PLMN A in list 140*d*, since it has one of the CS and PS services, but not both, and was the highest priority PLMN in the original list. Similarly, PLMN C and D follow, and the last entry is kept blank because PLMN B is considered unavailable.

In the (CS+PS) Only mode case, PLMN E likewise has risen to the top of the updated priority list 140*e*. However, the remaining entries in list 140*e* are blank because there are no other PLMNs having both CS and PS capability.

Figure 6:
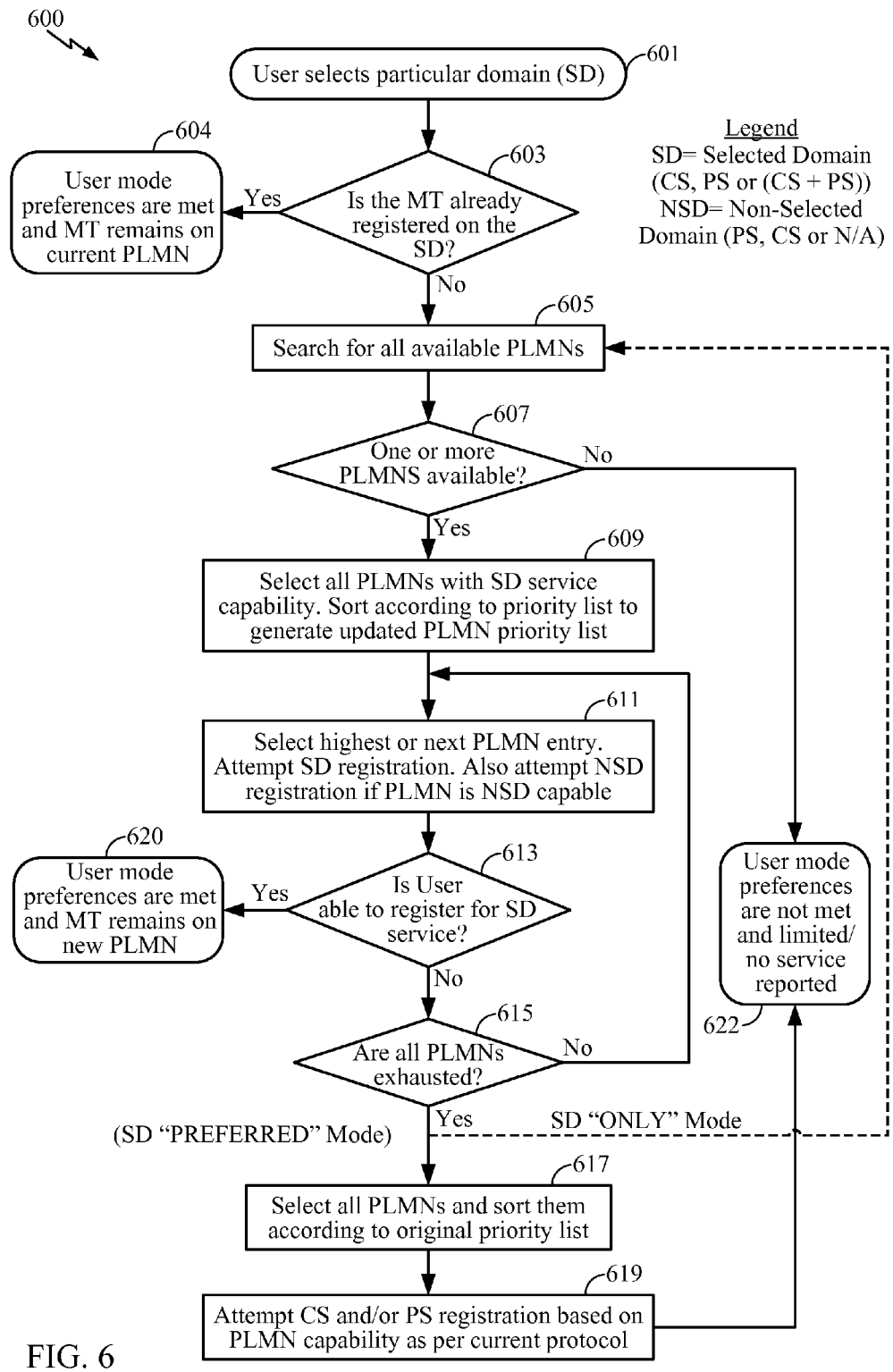
FIG. 6 is a flow diagram of a method for implementing domain specific PLMN selection within the MT in accordance with another exemplary embodiment.

FIG. 6 is a flow diagram of a process 600 for implementing domain specific PLMN selection within MT 100 in accordance with another exemplary embodiment. Process 600 may be used to implement PLMN selection in accordance with any of the selection modes discussed hereinabove, i.e., CS Voice Preferred, CS Voice Only, PS Data Preferred, PS Data Only, (CS+PS) Preferred, (CS+PS) Only and (CS+PS) No Preference modes. In FIG. 6, the legend "SD" denotes Selected Domain, which can be CS Voice, PS Data or (CS+PS). "NDS" denotes Non-Selected Domain, which is PS if CS Voice Preferred or CS Voice Only modes are selected. NSD is CS Voice if PS Data Preferred or PS Data Only modes are selected. NSD is not applicable if any of the (CS+PS) modes are selected.

Process 600 begins at step 601 when the user first selects a particular domain SD (step 601). Next, in step 603, the process determines if the MT is already registered on the SD. If so, the user mode preferences have been met and the MT remains on the current PLMN (step 604). If not, then in step 605, the MT searches for all available PLMNs. As mentioned earlier, PLMNs broadcast identification (ID) and domain availability information in one or more control channels. The MT may ascertain if signal strength or quality from a given PLMN is sufficient for it to be considered available.

Next, in step 607, the MT evaluates if one of more PLMNs is considered available. If not, the user mode preferences are not met, and the process ends in step 622, where no service or limited service (such as emergency service only) is reported on the MT display. The MT may then go through its normal routine for a no service condition (e.g., periodically renewing a search for PLMNs).

If at least one PLMN is available in step 607, the flow proceeds to step 609, where the MT selects all PLMNs with SD service capability. These PLMNs are then sorted according to the original priority list stored in non-volatile memory of the MT, to generate an updated PLMN priority list. Then, in step 611, the highest priority PLMN entry is selected for the selected domain (SD) registration. In this step, the MT also attempts registration for the non-selected domain (NSD) if that PLMN is NSD capable.

In the next step 613, the process determines if the MT user is able to successfully register for SD service. If so, the user mode preferences are met and the MT remains on the new PLMN in step 620. If not, step 615 determines if all PLMNs are exhausted. If not, the flow returns to step 611 where the next PLMN on the updated PLMN priority list is selected, and then registration is attempted there.

If all PLMNs are exhausted in step 615 and one of the SD Preferred modes have been selected (i.e., CS Preferred, PS Preferred or (CS+PS) Preferred) then the flow proceeds to step 617. In step 617, all available PLMNs are selected and sorted according to the original priority list. Then in step 619, CS and/or PS registration is attempted based on PLMN capability as per the current protocol (e.g., the 3GPP protocol). That is, the mobile terminal operates in a conventional mode at this point, but the user mode preference has not been met, as indicated by the arrow to block 622. If service is acquired on the NSD in step 619, then "limited" service would be reported in block 622 (i.e., limited to the NSD in this case). Otherwise, a no service condition is reported.

It is noted here that once a user selects a particular domain in step 601, this selection becomes a current setting of the mobile terminal. This setting may be retained indefinitely, even after a re-start operation or a power down/power up. MT 100 may periodically remind the user of the current setting via a display icon, audible, etc. Alternatively, whenever a re-start occurs, the domain preference may default to the original setting (i.e., (CS+PS) No Preference).

In an embodiment variant, whenever the MT winds up registered on a PLMN other than the HPLMN, the MT takes steps to switch registration back to the HPLMN as soon as possible. For instance, the desired user preference may be unavailable on the HPLMN due to temporary causes, and the MT is aware of this condition via control channel information relayed from the HPLMN. Accordingly, while already registered on a lower priority PLMN in step 620, the MT will then periodically attempt registration on the HPLMN. By way of example, an attempt interval can be set on the order of every 30 seconds, for a predetermined period of time. This re-attempt strategy can be expanded to include attempts on other relatively high priority PLMNs (based on the original list) if the MT winds up registered in step 620 on a relatively low priority PLMN of the original list.

In another embodiment variant, a network transmits information informing the MT of domain capability of equivalent PLMNs (EPLMNs) during a location update procedure. By this implementation, the MT can reselect to an EPLMN, i.e., attempt registration thereon, if it provides the desired service selected by the user.

Figure 7:
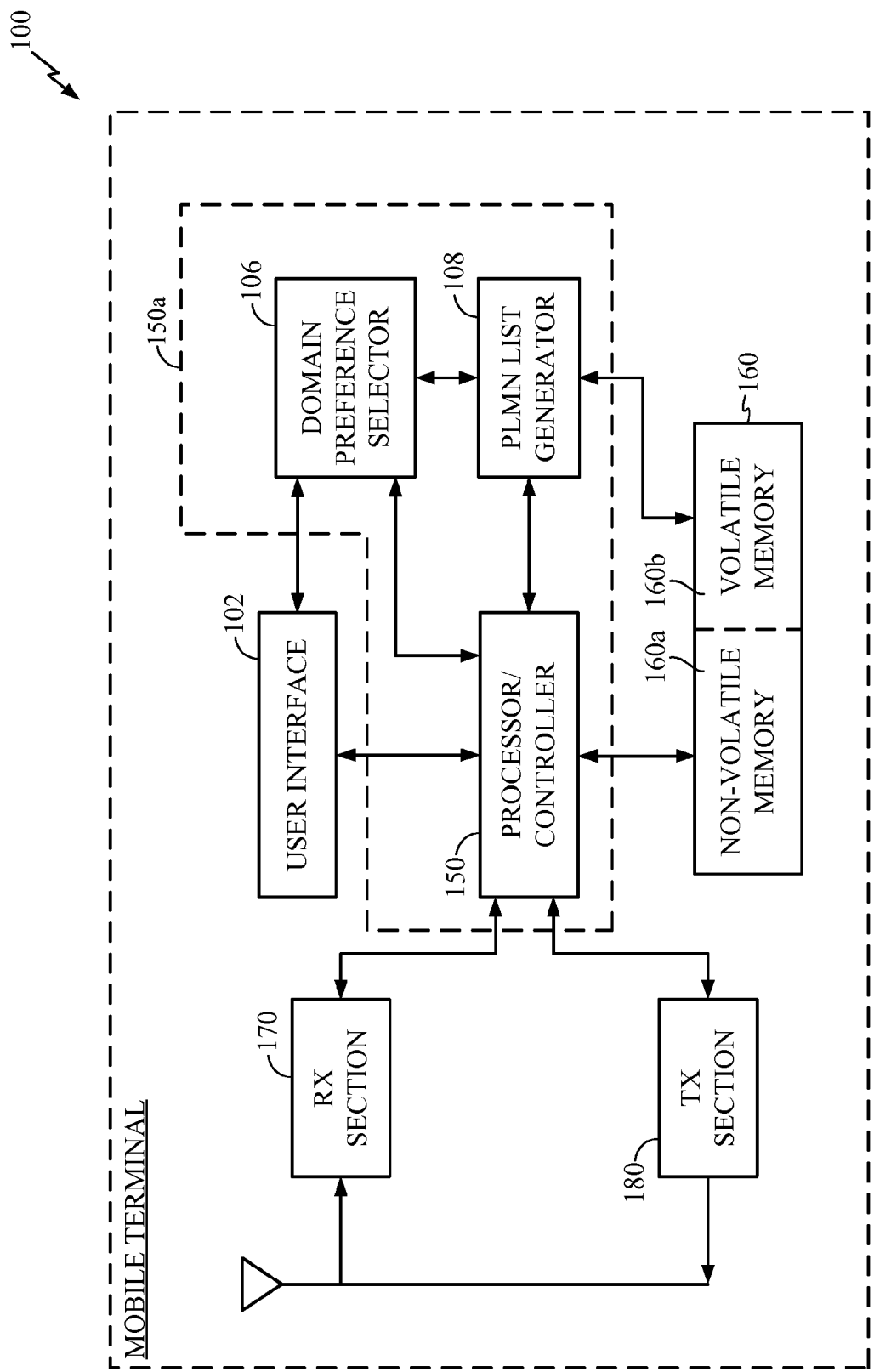
FIG. 7 is a lower level functional block diagram of the MT shown in FIG. 1 and FIG. 2.

FIG. 7 is a lower level functional block diagram of MT 100 in FIG. 1 and FIG. 2. Here, MT 100 again consists of UI 102, domain preference selector 106 and PLMN priority list generator 108, described earlier in connection with FIG. 2. (In an alternative embodiment, generator 108 can also operate as a PLMN assignor where priorities are assigned one by one "on the fly" and a list per se is not actually generated.) A processor/controller 150 performs the processing and controls operations generally of MT 100, in a known manner. A memory block 160 comprises a non-volatile memory portion 160*a* such as a SIM card, and a volatile portion 160*b*. Processor/controller 150 reads program instructions and data from memory 160. Receive section 170 filters, amplifies, demodulates, decodes and otherwise conditions downlink signals received at MT 100. The received and conditioned signals are forwarded to processor/controller 150. Transmit section 180 modulates and transmits uplink signals provided by processor/controller 150.

Domain preference selector 106 receives domain preference selection entered by a user via UI 102 described in embodiments herein. To this end, selector 106 interacts with UI 102 and provides domain preference selection candidates to UI 102 when a settings mode is selected for domain preference selection. Selector 106 also detects a selection of one of the candidates via UI 102, and forwards the selection to PLMN list generator 108. List generator 108 retrieves an original priority list from non-volatile memory 160*a* and generates an updated PLMN priority list based on the user preference selection, the original priority list and PLMN domain availability information provided by processor/controller 150. The updated list is then stored in volatile memory portion 160*b* or non-volatile memory portion 160*a* for use by processor/controller 150 in carrying out the PLMN registration attempt operations and other operations described in connection with FIGS. 3 and 6.

Domain preference selector 106 and PLMN list generator 108 may be implemented as software modules running on their own respective processors or on processor/controller 150. This latter implementation is represented by dotted line forming block 150a. Thus, block 150a can be considered as an expanded version of processor/controller 150. Block 150a may be implemented as an integrated circuit, along with portions or the entirety of blocks 160, 170, 180 and 102.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another.

A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A device for use in a wireless communication system, the device comprising:
    a domain preference selector to provide user selection candidates for domain preferences, including at least circuit switched (CS) voice and packet switched (PS) data domain preference candidates; and
    a PLMN priority list generator to obtain PLMN domain availability information and to assign a priority to at least one PLMN on the basis of the obtained information and a user selection of one of the domain preferences;
    wherein the user selection candidates comprises a CS Voice Preferred candidate in which a high priority is assigned to PLMNs having at least CS voice availability and a low priority is assigned to PLMNs having PS data availability without CS voice availability, and
    a PS Data Preferred candidate in which a high priority is assigned to PLMNs having at least PS data availability and a low priority is assigned to PLMNs having CS voice availability without PS data availability.

2. The device of claim 1, further comprising a processor/controller for attempting registration on the at least one PLMN in accordance with the priority assigned.

3. The device of claim 1, wherein,
    the at least one PLMN is a plurality of PLMNs, wherein the PLMN domain availability information is received from the plurality of PLMNs; and the PLMN priority list generator assigns a PLMN priority to each of the plurality of PLMNs to generate a PLMN priority list on the basis of the received information and the user selection.

4. The device of claim 3, wherein the PLMN priority list is generated by updating an original PLMN priority list stored in non-volatile memory of the device in accordance with the user selection and the received information.

5. The device of claim 1, wherein the user selection candidates further include a (CS+PS) domain preference candidate.

6. The device of claim 5, wherein the user selection candidates comprise:
a (CS+PS) Preferred candidate in which a high priority is assigned to PLMNs having both CS voice and PS data availability and a low priority is assigned to PLMNs only one of PS data and CS voice availability.

7. The device of claim 6, wherein the user selection candidates further comprise:
a CS Voice Only candidate in which a high priority is assigned to PLMNs having at least CS voice availability, and in which PLMNs having PS data availability without CS voice availability are excluded from consideration; and
a PS Data Only candidate in which a high priority is assigned to PLMNs having at least PS data availability, and in which PLMNs having CS voice availability without PS data availability are excluded from consideration.

8. A device for use in a wireless communication system, the device comprising:
means for providing user selection candidates for domain preferences, including at least circuit switched (CS) voice and packet switched (PS) data domain preference candidates; and
means for obtaining PLMN domain availability information and for assigning a priority to at least one PLMN on the basis of the obtained information and a user selection of one of the domain preferences;
wherein the user selection candidates comprises a CS Voice Preferred candidate in which a high priority is assigned to PLMNs having at least CS voice availability and a low priority is assigned to PLMNs having PS data availability without CS voice availability, and
a PS Data Preferred candidate in which a high priority is assigned to PLMNs having at least PS data availability and a low priority is assigned to PLMNs having CS voice availability without PS data availability.

9. The device of claim 8, wherein the user selection candidates comprise:
a (CS+PS) Preferred candidate in which a high priority is assigned to PLMNs having both CS voice and PS data availability and a low priority is assigned to PLMNs only one PS data and CS voice availability.

10. A method for use in a mobile communication device (100), the method comprising:
receiving PLMN domain availability information from at least one PLMN;
receiving a user selection for a domain preference from among at least circuit switched (CS) voice and packet switched (PS) data domain preference candidates; and
assigning a priority to the at least one PLMN on the basis of the received information and the user selection;
wherein the user selection candidates comprises a CS Voice Preferred candidate in which a high priority is assigned to PLMNs having at least CS voice availability and a low priority is assigned to PLMNs having PS data availability without CS voice availability, and
a PS Data Preferred candidate in which a high priority is assigned to PLMNs having at least PS data availability and a low priority is assigned to PLMNs having CS voice availability without PS data availability.

11. The method of claim 10, wherein,
the at least one PLMN is a plurality of PLMNs, wherein the PLMN domain availability information is received from the plurality of PLMNs; and
said assigning a PLMN priority to the at least one PLMN comprises generating a priority list on the basis of the received information and the user selection.

12. The method of claim 11, wherein said generating a PLMN priority list comprises updating an original PLMN priority list stored in non-volatile memory of the device in accordance with the user selection and the received information.

13. The method of claim 12, further comprising attempting registration on a PLMN in an order defined by the generated PLMN priority list.

14. The method of claim 13, wherein if registration is successful on a PLMN that is not a highest priority PLMN of the original list, the method further comprises:
determining if a higher priority PLMN according to the original list is unavailable for service in the selected domain for only a temporary reason, and if so, attempting registration on the higher priority PLMN at a periodic time interval.

15. The method of claim 13, wherein if registration is successful on a PLMN that is not a highest priority PLMN of the original list, the method further comprises periodically re-attempting registration on higher priority available PLMNs having the selected domain according to a priority defined by the original list.

16. The method of claim 10, wherein the user selection candidates further include a (CS+PS) domain preference candidate.

17. The method of claim 10, wherein the user selection candidates comprise:
a (CS+PS) Preferred candidate in which a high priority is assigned to PLMNs having both CS voice and PS data availability and a low priority is assigned to PLMNs only one PS data and CS voice availability.

18. The method of claim 17, wherein the user selection candidates further comprise:
a CS Voice Only candidate in which a high priority is assigned to PLMNs having at least CS voice availability and PLMNs having PS data availability without CS voice availability are excluded from consideration; and
a PS Data Only candidate in which a high priority is assigned to PLMNs having at least PS data availability and PLMNs having CS voice availability without PS data availability are excluded from consideration.

19. A computer program product recorded on a non-transitory computer readable medium and executable on a computer to cause a mobile communication device to:
receive PLMN domain availability information from at least one PLMN;
receive a user selection for a domain preference from among at least circuit switched (CS) voice and packet switched (PS) data domain preference candidates; and
assign a priority to the at least one PLMN on the basis of the received information and the user selection;
wherein the user selection candidates comprises a CS Voice Preferred candidate in which a high priority is assigned to PLMNs having at least CS voice availability and a low priority is assigned to PLMNs having PS data availability without CS voice availability, and a PS Data Preferred candidate in which a high priority is assigned to PLMNs having at least PS data availability and a low priority is assigned to PLMNs having CS voice availability without PS data availability.

20. The computer program product of claim 19, wherein, the at least one PLMN is a plurality of PLMNs, wherein the PLMN domain availability information is received from the plurality of PLMNs; and said assigning a PLMN priority to the at least one PLMN comprises generating a priority list on the basis of the received information and the user selection.

21. The computer program product of claim 20, wherein the user selection candidates comprise:
  a (CS+PS) Preferred candidate in which a high priority is assigned to PLMNs having both CS voice and PS data availability and a low priority is assigned to PLMNs only one PS data and CS voice availability;
  a CS Voice Only candidate in which a high priority is assigned to PLMNs having at least CS voice availability and PLMNs having PS data availability without CS voice availability are excluded from consideration; and
  a PS Data Only candidate in which a high priority is assigned to PLMNs having at least PS data availability and PLMNs having CS voice availability without PS data availability are excluded from consideration.

* * * * *